UNITED STATES PATENT OFFICE.

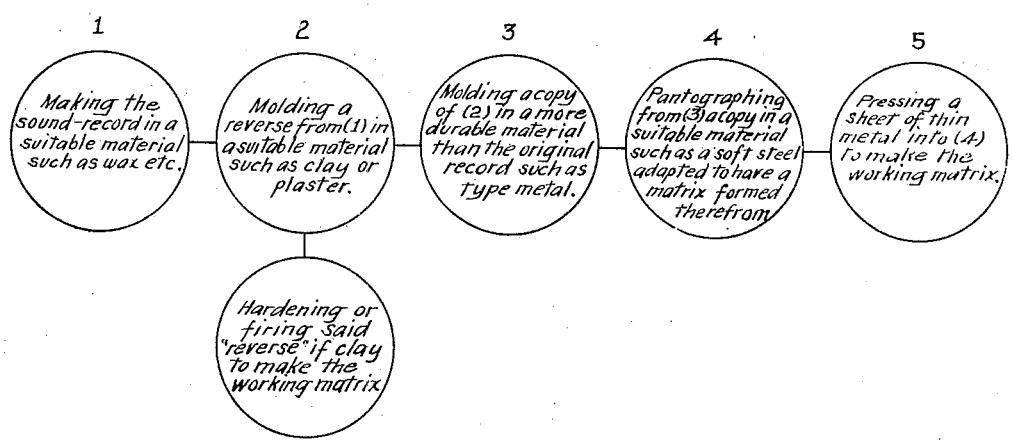

ROBERT HEAD, OF NEW YORK, N. Y., ASSIGNOR TO THE AEOLIAN COMPANY, A CORPORATION OF CONNECTICUT.

PROCESS OF MAKING SOUND-RECORDS.

1,358,949.      Specification of Letters Patent.    Patented Nov. 16, 1920.

Application filed July 15, 1915. Serial No. 40,108.

*To all whom it may concern:*

Be it known that I, ROBERT HEAD, a citizen of the United States, residing at 206 West 85th street, New York, N. Y., have invented certain new and useful Improvements in Processes of Making Sound-Records, of which the following is a specification.

My present invention relates to improvements in methods of making sound records. The features and advantages of my improvements will be apparent to those skilled in the art from an understanding of the following description.

The accompanying drawing shows diagrammatically the different steps of the method constituting the subject-matter of the present invention.

I cut or trace the original sound-record as a groove in a wax-like material which is capable of accurately recording the original sounds.

Starting with the grooved record, in wax, I make its reverse by molding it in plaster, clay or the like. The clay reverse may be dried or even baked or burnt like pottery.

From this plaster or clay reverse, I then mold a type or other suitable metal copy, usable in a pantograph as a pattern or guide record from which to cut a duplicate record of the same or a different size, preferably smaller to minimize any errors or discrepancies, said duplicate record being cut (as set forth by me in my Patent No. 1,318,997, granted March 18, 1918) in soft steel, adapted subsequently to be hardened, and from which a thin sheet steel copy is adapted to be pressed, hardened and backed up to form a matrix by which the commercial records can be pressed.

Or I take the aforesaid plaster or clay reverse, and mold a plaster or clay copy from it. Then using this as a mold, I make a steel or other suitable metal casting which I then treat in the usual or well known way for use as a matrix by which to press the commercial records.

Or I take the aforesaid clay reverse fired to make it sufficienty strong and use it as a matrix to press the commercial records or I may press into the fired clay copy by carefully applied, gradually increasing pressure a thin steel or other suitable metal-plate, which I subsequently manipulate in the usual or well known manner to form a matrix by which to press the commercial records.

What I claim is:—

1. The process which comprises originally recording a sound groove in wax, and molding a reverse therefrom in a plastic material capable of setting.

2. The process which comprises originally recording a sound groove in a wax-like material, molding a reverse from said original in a plastic material capable of setting, and making from said reverse, after it has set, a copy of the original in metal.

3. The process which comprises originally recording a sound groove in a wax-like material, molding a reverse therefrom in a plastic heat resistive material capable of setting, casting a copy of the original from said reverse in metal, pantographing a copy from said metal copy, and forming a matrix from said pantographed copy.

In testimony whereof, I have signed my name to this specification, this 13th day of July, 1915.

ROBERT HEAD.